US006941808B2

(12) United States Patent
Gouzou et al.

(10) Patent No.: US 6,941,808 B2
(45) Date of Patent: Sep. 13, 2005

(54) DRAWING AND GAUGING DEVICE FOR A MOTOR VEHICLE FUEL TANK

(75) Inventors: Christophe Gouzou, Chalons en Champagne (FR); Eric Renard, Compertrix (FR); Emmanuel Demanche, Chalons en Champagne (FR); Robert Renaud, Chalons-en-Champagne (FR)

(73) Assignee: Marwal Systems, Chalons en Champagne (FR)

(*) Notice: Subject to any disclaimer, the term of this patent is extended or adjusted under 35 U.S.C. 154(b) by 219 days.

(21) Appl. No.: 10/381,270

(22) PCT Filed: Sep. 20, 2001

(86) PCT No.: PCT/FR01/02922

§ 371 (c)(1), (2), (4) Date: Aug. 1, 2003

(87) PCT Pub. No.: WO02/25094

PCT Pub. Date: Mar. 28, 2002

(65) Prior Publication Data

US 2004/0020289 A1 Feb. 5, 2004

(30) Foreign Application Priority Data

Sep. 21, 2000 (FR) ........................................... 00 12030

(51) Int. Cl.[7] ......................... G01F 23/36; G01F 23/52; G01F 23/60

(52) U.S. Cl. .......................... 73/313; 73/290 R; 73/317

(58) Field of Search ....................... 73/313, 317, 290 R

(56) References Cited

U.S. PATENT DOCUMENTS

| | | | | | |
|---|---|---|---|---|---|
| 4,641,122 | A | * | 2/1987 | Hennequin | 338/33 |
| 4,750,518 | A | * | 6/1988 | Griffin et al. | 137/565.17 |
| 5,272,918 | A | * | 12/1993 | Gaston et al. | 73/290 R |
| 5,678,449 | A | * | 10/1997 | Mollet et al. | 73/319 |
| 6,000,913 | A | * | 12/1999 | Chung et al. | 417/53 |

FOREIGN PATENT DOCUMENTS

| | | | | | |
|---|---|---|---|---|---|
| DE | 19912494 | A1 * | 9/1999 | | F02M/37/10 |
| EP | 941885 | A2 * | 9/1999 | | B60K/15/077 |
| EP | 947369 | A1 * | 10/1999 | | B60K/15/077 |
| EP | 1092861 | A1 * | 4/2001 | | F02M/37/10 |

* cited by examiner

*Primary Examiner*—Hezron Williams
*Assistant Examiner*—Rodney Frank
(74) *Attorney, Agent, or Firm*—Blakely Sokoloff Taylor & Zafman

(57) ABSTRACT

The invention concerns a drawing and gauging device for a motor vehicle fuel tank, characterised in that it comprises two support assemblies (100, 200) mobile relative to each other when the device is being installed on site for use in the motor vehicle and an arm (450) pivotally mounted on one of the support assemblies bearing a gauging transducer (400), the arm (450) being maintained in retracted position, when stored, by the other element (200), such that the arm (450) is automatically unfolded when the device is installed.

21 Claims, 7 Drawing Sheets

DRAWING AND GAUGING DEVICE FOR A MOTOR VEHICLE FUEL TANK

The present patent application is a non-provisional application of International Application No. PCT FR01/02922, filed Sep. 20, 2001.

The present invention relates to the field of motor vehicle fuel tanks.

More specifically, the present invention relates to a drawing and gauging device for such a tank.

Numerous devices intended to draw and gauge fuel in a motor vehicle fuel tank have already been proposed.

The purpose of the present invention is to provide a novel device which has properties superior to those of the earlier known devices.

This objective is achieved in the context of the present invention by virtue of a drawing and gauging device for a motor vehicle fuel tank, comprising an arm mounted so that it can move on the device and which bears a gauging transducer, blocking means able initially to hold the arm in a retracted position folded against the body of the device, means which urge the arm toward a deployed position and means able automatically to release the blocking means as the device is fitted in a tank, in order automatically to deploy the arm in the tank.

According to a first alternative form, the device comprises two support assemblies capable of relative movement upon installation at a site of use into a motor vehicle tank, the arm being mounted to pivot on one of the support assemblies and the arm being held in the retracted position, in storage, by the second element so that the arm is automatically deployed as the device is installed.

According to a second alternative form, the blocking means comprises a lever mounted so that it can move on the body of the device, which interferes with the path of movement of the arm, and designed itself to be automatically retracted upon introduction into a tank by contact with the edge of the orifice through which it is being introduced.

According to another advantageous feature of the invention, in the context of the second alternative form, the device comprises a pin or an equivalent means able initially to lock the blocking means.

According to another advantageous feature of the present invention, the transducer is a piezoelectric transducer.

According to another advantageous feature of the present invention, the two support assemblies are slideably mounted, one of them being intended to rest against the bottom of the tank, while the other is intended to be fixed to a wall of the tank, preferably the upper wall thereof.

Figure 2:
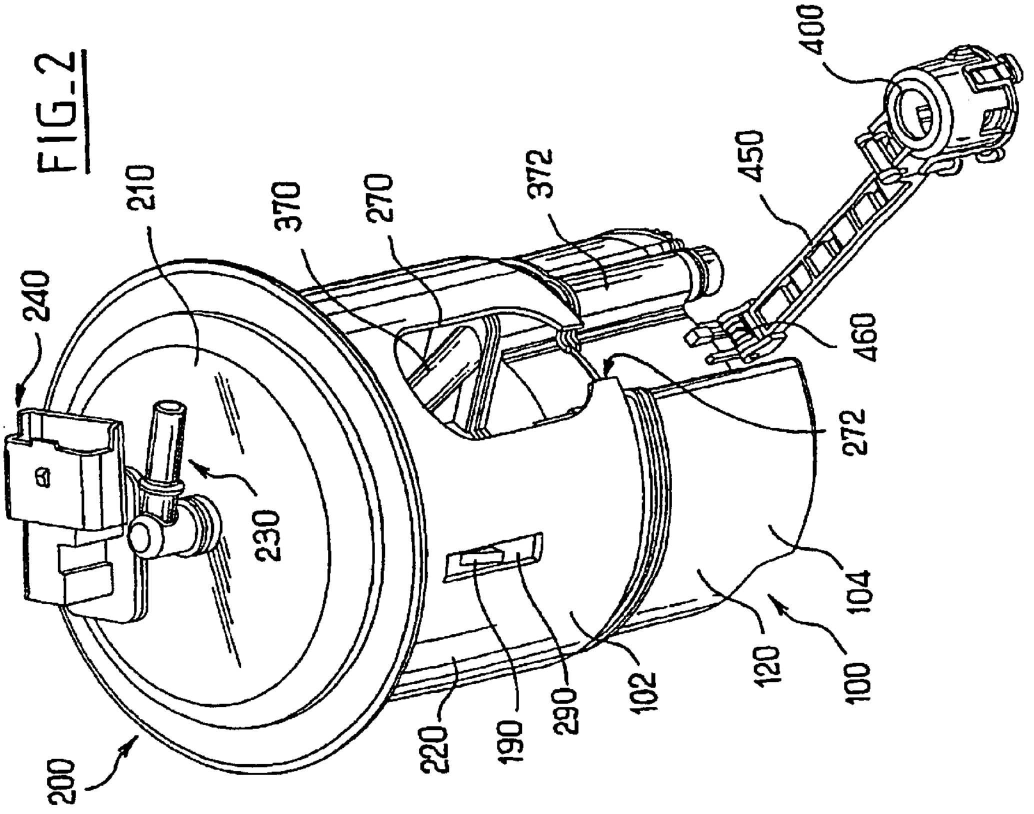
Figure 1:
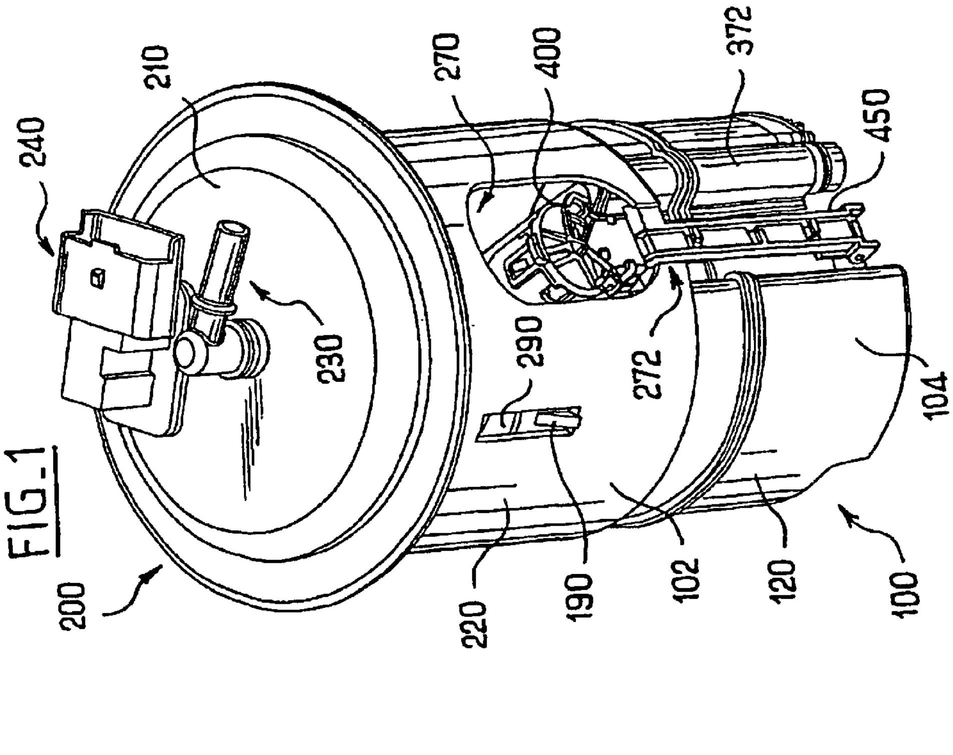
Figure 4:
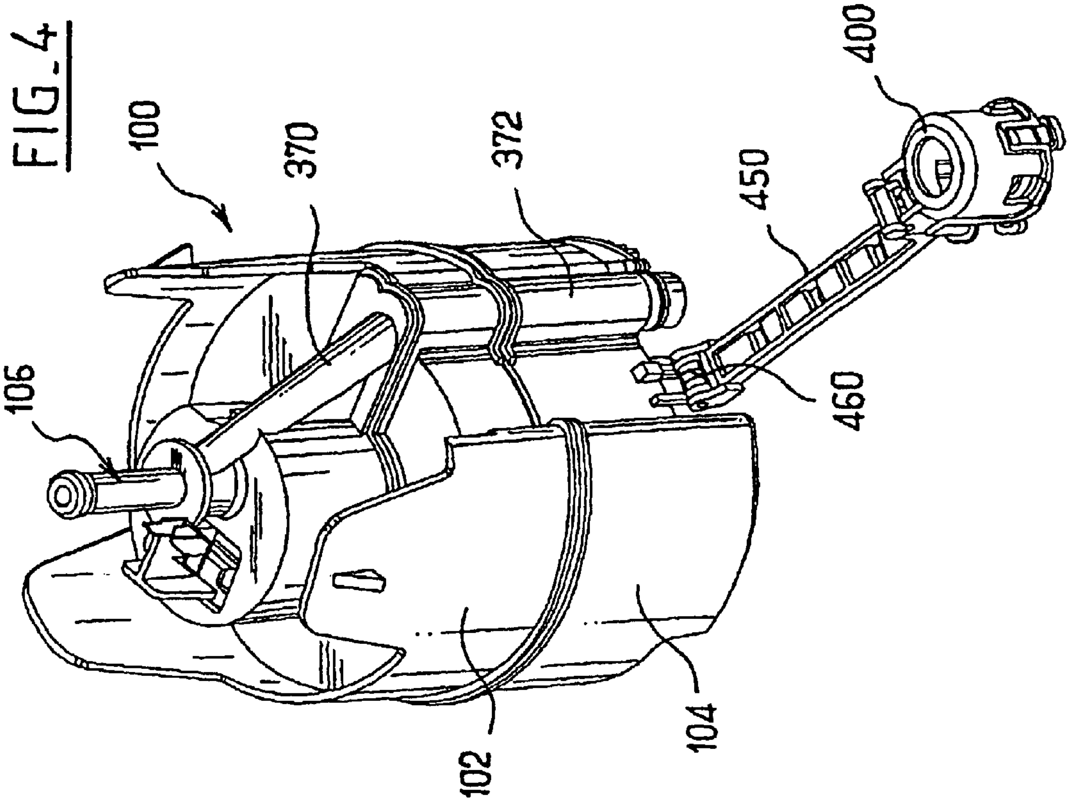
Figure 3:
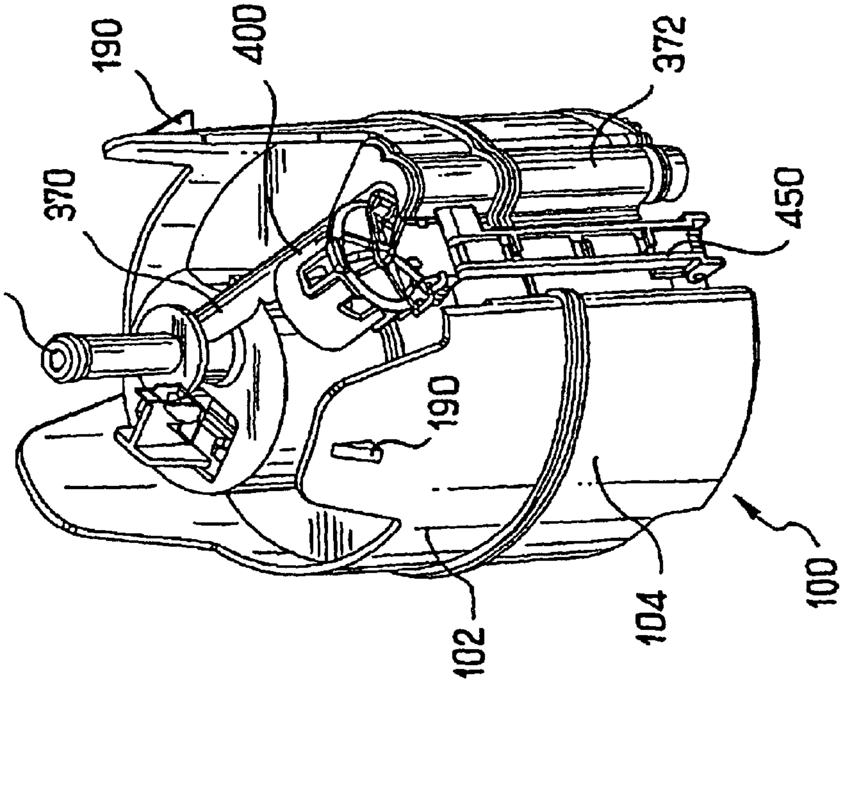
Figure 6:
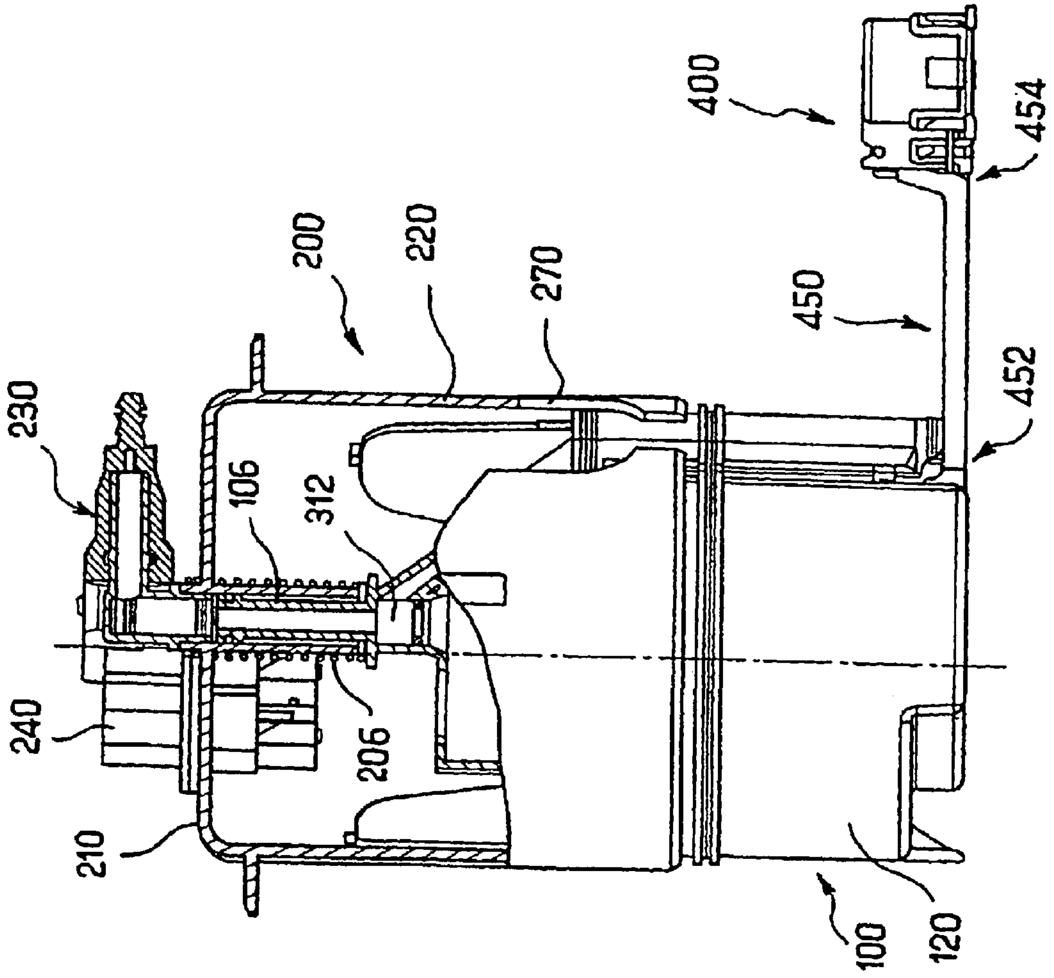
Figure 5:
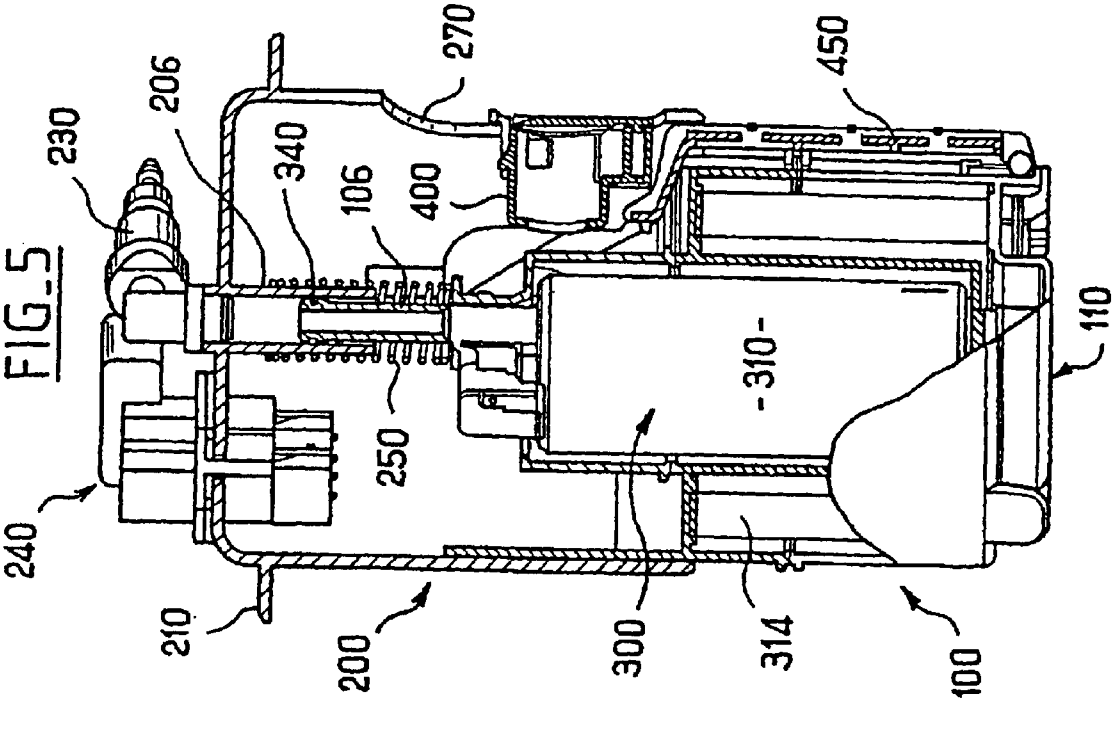
Figure 7:
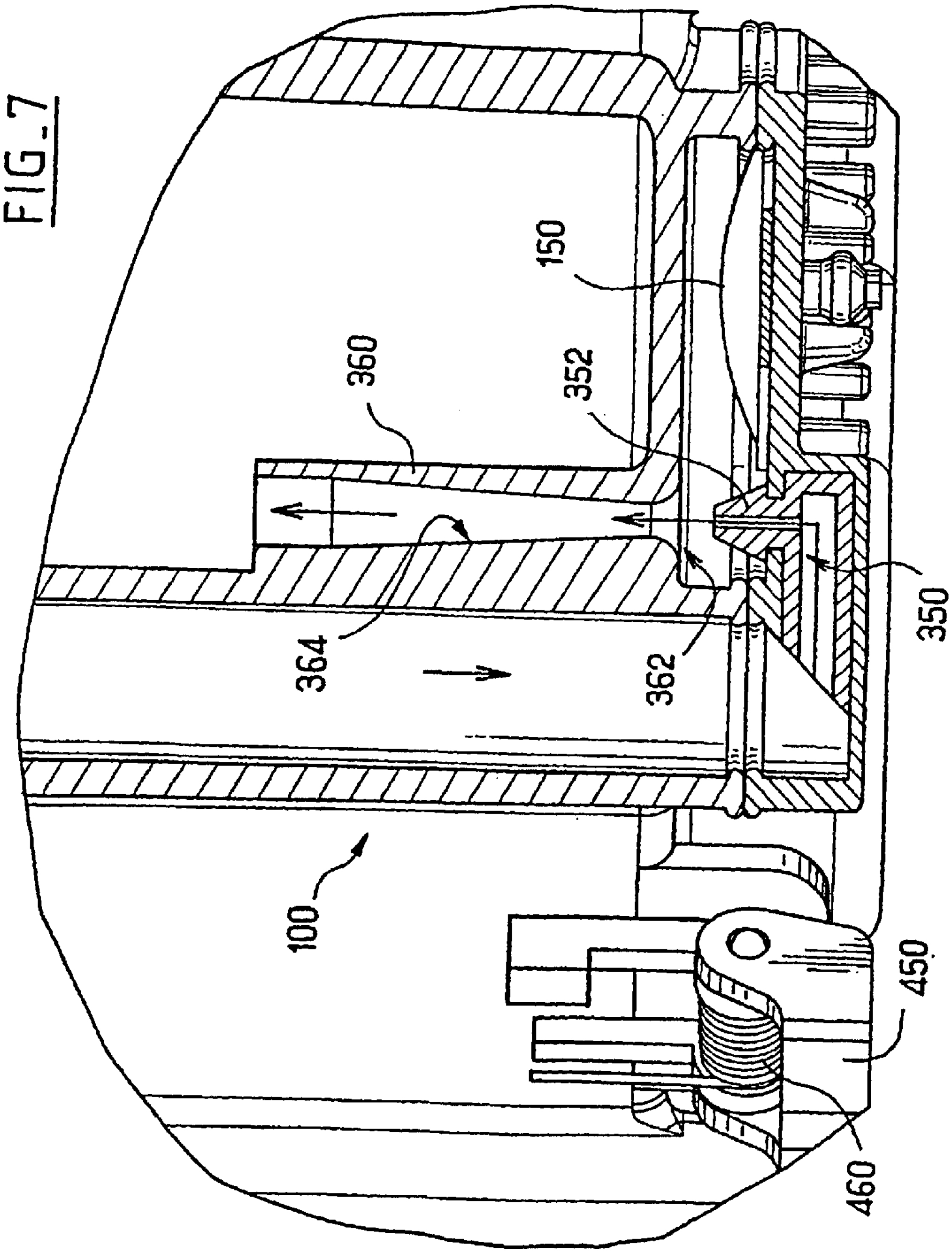
Figure 8:
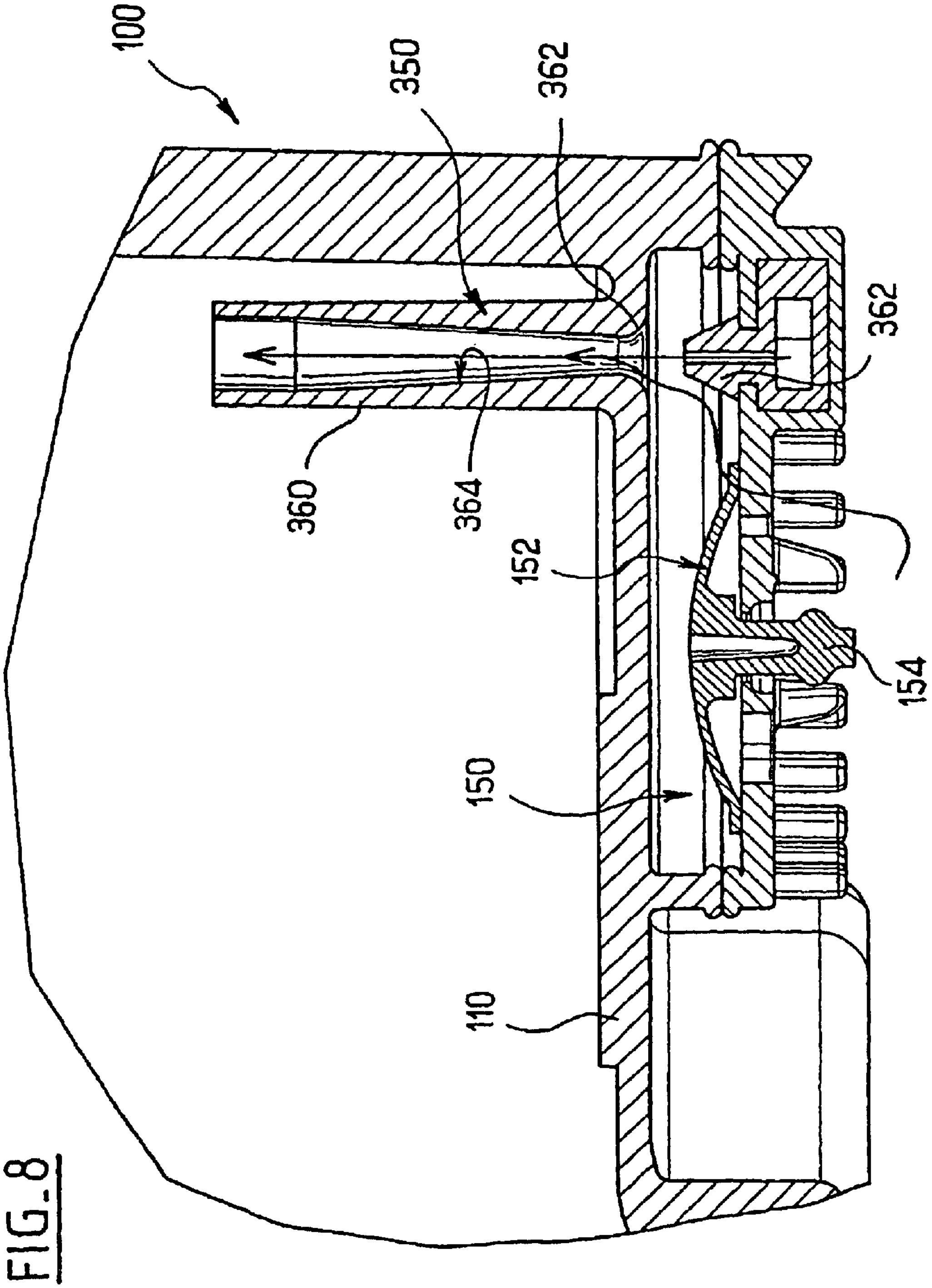
Figure 9:
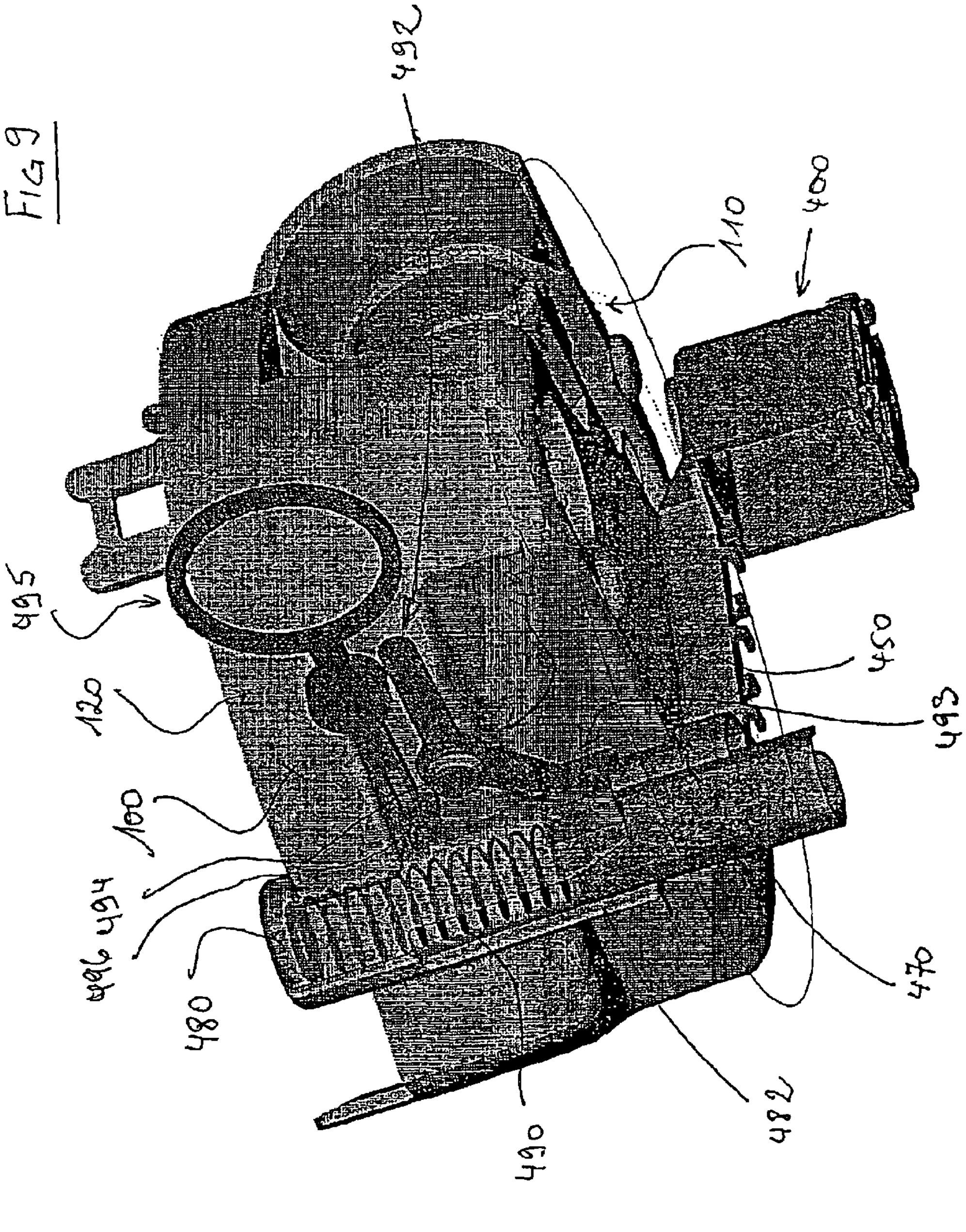
Figure 10:
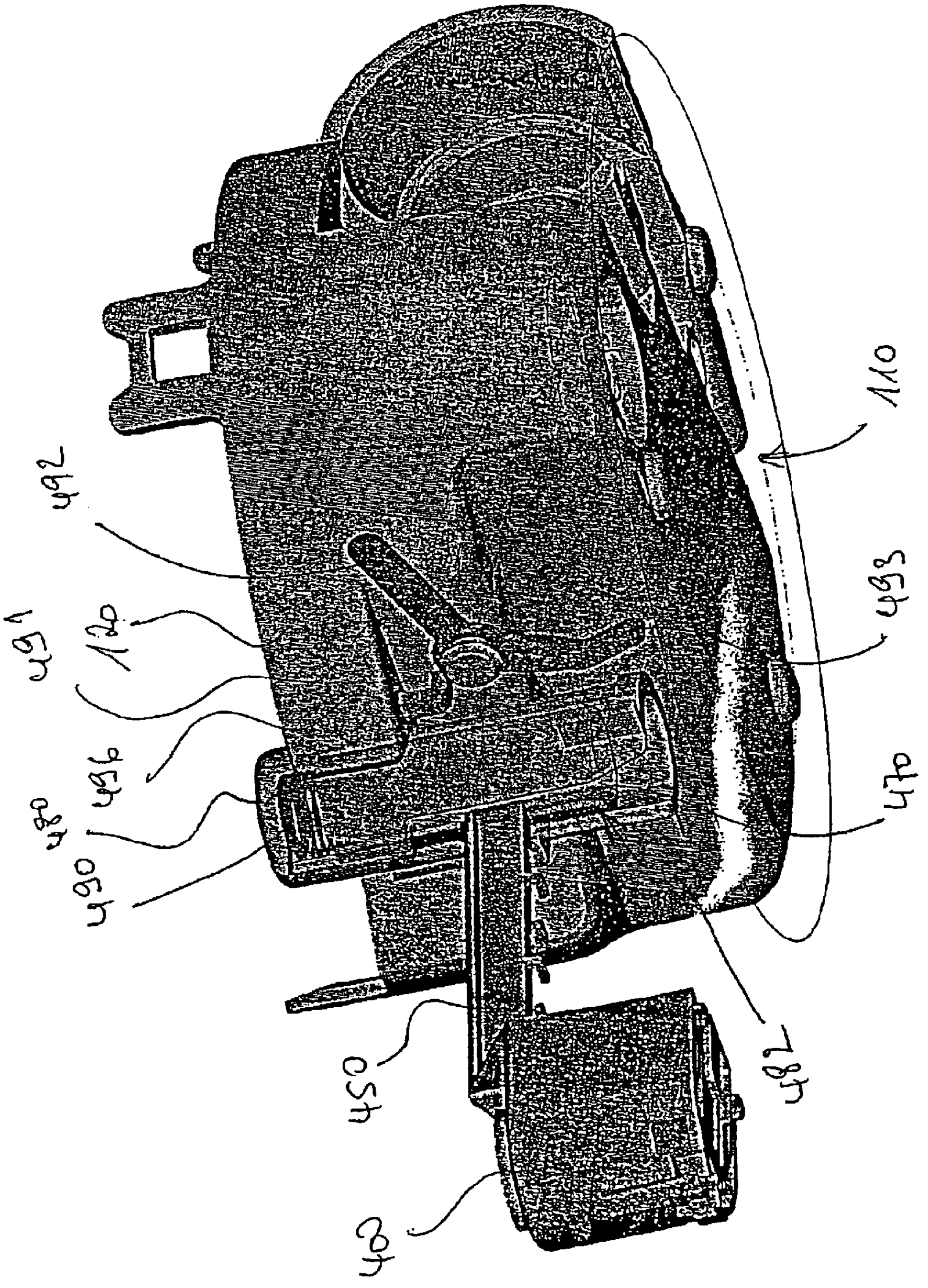

Other features, objects and advantages of the present invention will become apparent from reading the detailed description which will follow, and from studying the appended drawings, given by way of nonlimiting example, and in which:

FIG. 1 depicts a schematic perspective view of a device according to the present invention, with the transducer-supporting arm in the retracted position, FIG. 2 depicts a similar view in perspective, with the transducer-supporting arm in the deployed position, FIGS. 3 and 4 depict perspective views similar respectively to FIGS. 3 and 4, that is to say with the arm in the retracted and deployed positions, with the upper support element removed, FIG. 5 depicts a view in vertical section of the device according to the present invention, with the transducer-supporting arm in the retracted position, FIG. 6 depicts a part view of the same device in vertical section and with the transducer-supporting arm in the deployed position, FIG. 7 depicts a part view of the device in vertical section passing through a venturi-effect pumping device, FIG. 8 depicts another part view of the same device in vertical section, and FIGS. 9 and 10 depict schematic part perspective views of a device according to a second alternative form of the embodiment of the present invention, with the arm bearing the gauging transducer respectively in a retracted position and in a deployed position.

The first alternative form of embodiment illustrated in FIGS. 1 to 8 will be described first of all.

The device illustrated in the appended figures comprises a support housing formed of two assemblies 100, 200 capable of relative movement in vertical translation, a drawing means 300 and a gauging means 400.

The first support assembly 100 is intended to rest on the bottom of a motor vehicle fuel tank.

It has the overall shape of a bowl open toward the top. For this, the first support assembly 100 is essentially made up of an end wall 110 extended upward by a skirt 120 which, on the whole, is cylindrical.

The first assembly 100 here constitutes a reserve from which an electric pump 310 that constitutes the main drawing means 300 can draw.

This reserve consisting of the first assembly 100 can be filled with fuel by any appropriate means.

As a preference, the reserve bowl consisting of the assembly 100 is filled by a venturi-effect pump illustrated in part under the reference 350 in FIGS. 7 and 8.

The overall structure of such a venturi-effect pump is well known to those skilled in the art. It will therefore not be described in detail hereinafter.

However, it is recalled that, in a way known per se, a venturi-effect pump comprises a fed nozzle 352 which delivers opposite a pipe 360 comprising, at least, in succession, a convergent section 362 followed by a divergent section 364. The entry to the pipe 360 communicates with the inside of the fuel tank in order to suck fuel into the latter using the depression created by the venturi effect.

More specifically still, according to the particular embodiment illustrated in the appended figures, the entry to the pipe 360 communicating with the inside of the tank is controlled by a valve 150.

Such a valve may be embodied in numerous ways. It will therefore not be described in detail hereinafter.

However, it will be noted that, according to the preferred embodiment illustrated in the appended figures, the valve 150 has the overall shape of a mushroom or umbrella having a head 152 and a shank 154. The head 152 has the shape of a spherical cup with the concave side facing downward, which rests via its periphery on the upper surface of a wall of the support element 100. At rest, the head 152 thus covers the through-passages made in this wall in order to shut these off.

The shank 154 projects downward in a central position on the lower surface of the head 152. The shank 154 acts as a stabilizer and passes through an orifice formed in the aforesaid wall of the support element 100. As a preference, the shank 154 has a widening of cross section which exceeds the passage that accommodates the shank 154 so as to limit the upward movement of the valve 150, which movement is generated when the venturi-effect pump pulls a vacuum in order thus to suck fuel from inside the fuel tank into the reserve bowl consisting of the support element 100.

As a preference, the valve 150 is made of an elastomeric material compatible with the fuel so as on the one hand to provide a good seal, around its edge, against the associated wall of the support element 100 and, on the other hand, to allow the shank 154 to pass through the orifice in the support wall in spite of the widening of the shank 154.

According to the particular embodiment depicted in the attached figures, the pipe 360 forming the outlet of the venturi-effect pump is vertical, with the outlet facing upward.

Thus, the height of the pipe 360 defines the minimum head of the reserve of fuel in the bowl 100, whatever the sealing of the valve 150.

The pipe 360 is preferably molded onto the lower wall 110 of the support element 100. By contrast, the nozzle 352 is preferably formed from an element attached to the support element 100.

The nozzle 352 can be fed by any appropriate means, for example, as is the case in the embodiment illustrated in the attached figures, by a high-pressure stage on the outlet side of the pump 310, or, as an alternative, by a return line for the fuel not used by the engine.

More specifically still, according to the particular embodiment illustrated in the appended figures, the nozzle 352 is fed via pipes 370, 372 providing communication between the outlet side of the pump 310 and the inlet side of the nozzle 352.

The two pipes 370, 372 are molded onto two superposed shells 102, 104, respectively, which shells in combination form the lower support element 100.

As can be seen in particular in FIG. 4, the pipe 372 provided in the lower shell 104 is essentially vertical and incorporated into the cylindrical skirt 120.

The associated pipe 370 provided in the upper shell 102 is essentially oblique and provides communication between a central nozzle 106 receiving the pump outlet and the upper end of the aforesaid pipe 372.

The second support assembly 200 has the overall shape of a bell comprising a base or upper wall 210 extended downward by a cylindrical skirt 220. The support assembly 200 is intended to be superposed with the lower support assembly 100, the lower end of its skirt 220 surrounding the upper end of the cylindrical skirt 120.

The two assemblies 100, 200 are capable of relative translational movement in a vertical direction.

The two assemblies 100, 200 are thus guided by the collaboration between the skirts 120, 220. They are also guided by a tube 206 molded in a central position onto the lower surface of the base 210. The tube 206 receives the aforesaid nozzle 106.

As a preference, an elastic member such as a helical spring 250 is engaged over the tube 206 between the two support elements 100, 200 to urge these apart.

However, as a preference, means limiting the separation of the two support assemblies 100, 200 are provided.

According to the nonlimiting particular embodiment illustrated in the appended figures, these separation-limiting means are formed of a plurality of sets of teeth 190 molded onto the outer surface of the skirt 120 and engaged in associated openings 290 formed in the skirt 220.

As can be seen in particular in FIG. 6, the outlet side 312 of the pump 310 communicates with the nozzle 106. The latter is mounted to slide in the tube 206. Further, means of sealing between the outer surface of the nozzle 106 and the inner surface of the tube 206 are provided. These sealing means may be embodied in numerous different ways. They are preferably formed as an annular seal with a four-lobe X-shaped cross section.

This seal is referenced 340 in the appended figures.

The Applicant Company has found in particular that the direct connection thus defined between a nozzle 106 connected to the outlet side of the pump and the tube 206 connected to the base 210 (the nozzle 106 and the tube 206 being preferably made of a thermoplastic such as polyacetal) makes it possible considerably to limit the risk of any accumulation of electrostatic charge likely to create risks of explosion, as is sometimes encountered with connections based on ringed tubes placed on the outlet side of fuel pumps.

The electric pump 310 is supported inside the pumping chamber formed by the collaboration of the two shells 102, 104 by any appropriate means.

As a preference, the pump 310 is associated with a fine filter 314 also placed in the internal volume of the suction chamber formed by the two shells 102, 104.

The fine filter 314 is preferably annular and placed around the pump 310. The fine filter 314 is preferably placed on the inlet side of the pump 310.

The connection between the peripheral edges of the two shells 102, 104, after the installation of the fine filter 314 and of the pump 310 may be made by any appropriate means, preferably by ultrasound welding.

If need be, a pressure regulator may be associated with the outlet side of the pump 310. The pressure regulator may be borne by one or other of the two support elements 100, 200.

The tube 206 opens into a nozzle 230 arranged on the upper surface of the base 210 and itself designed to provide a connection with the use site of the engine.

According to the present invention, this nozzle 230 is preferably attached to the base 210 and designed to be arranged on the base 210 in several positions, depending on the surroundings, namely at least two positions 180° apart.

The nozzle 230 may itself be embodied in numerous ways. It will therefore not be described in detail hereinafter.

Of course, a sealed connection needs to be made between the nozzle 230 and the tube 206.

Likewise, the base 210 bears, on its upper surface, an electric connector 240, designed, on the one hand, to supply power to the pump 310 and, on the other hand, to provide the connection to the transducer 400.

Here again, as a preference, the connector 240 is connected to the base 210 and designed to be arranged in various orientations, as desired, depending on the surroundings.

As indicated before, in the context of the present invention, the transducer 400 is borne at the end of a pivoting arm 450.

More specifically still, the arm 450 is designed to be moved automatically between a retracted position in storage, in which the arm 450 is arranged vertically in a recess formed in the skirt 120 and the transducer 400 is arranged in the internal volume of the skirt 220, on the one hand, as illustrated in particular in FIGS. 1, 3 and 5 and, on the other hand, a deployed position illustrated in FIGS. 2, 4 and 6 in which the arm 450 extends generally horizontally in a radial direction with respect to the central vertical axis of the gauging and drawing device.

More specifically still, the arm 450 is mounted to pivot via a first end 452 about a horizontal axis on the base of the reserve bowl, that is to say at the region of connection between the lower wall 110 and the cylindrical skirt 120.

The transducer 400 preferably formed of a piezoelectric transducer is provided on the second end of the arm 450.

The length and the orientation of the arm 450 are preferably tailored so that the piezoelectric transducer 400 is arranged vertically in line with the point of greatest storage capacity of the tank (that is to say in the region of the tank that has the greatest height).

The transducer 400 can be borne by any appropriate means on the second end 454 of the arm 450. It may, for example, be fixed with the aid of clipping means.

Likewise, the means temporarily holding the arm 450 in the storage position and automatically deploying it may be embodied in numerous ways.

As a preference, these means essentially consist of an opening 270 formed in the cylindrical skirt 220 of the bell 200.

The opening 270 has an oblong overall shape directed vertically. Its vertical extent is very much greater than the corresponding bulk of the transducer 400. Its horizontal width complements and slightly exceeds the corresponding bulk of the transducer 400. However, the opening 270 opens onto the lower edge of the support element 200 via a passage 272 of lesser width, slightly wider than the width of the arm 450 to allow the latter to pass, but less than the corresponding bulk of the transducer 400.

Incidentally, at rest, the position defined between the two support elements 100, 200 is such that the reduced-width passage 272 lies level with the transducer 400. Thus, the latter rests on the internal surface of the skirt 220 facing the passage 272.

By contrast, when the device is installed at its use site, the two support assemblies 100, 200 are brought closer together when the lower support assembly 100 comes to rest on the bottom of the fuel tank. Thus, the opening 270 drops with respect to the transducer 400. The transducer 400 and the arm 450 are freed as soon as the window 270 comes fully to face the transducer 400.

The arm 450 and the transducer 400 are therefore deployed in the horizontal position, as illustrated in FIGS. 2, 4 and 6.

The movement of the arm 450 from the vertical retracted position illustrated in FIGS. 1, 3 and 5 to the horizontal deployed position illustrated in FIGS. 2, 4 and 6 can be achieved simply by gravity. However, as a preference, the arm 450 is urged to move horizontally into the deployed position by an associated elastic member.

As a preference, this is a helical spring 460 illustrated for example in FIG. 7, arranged on the axis of rotation of the arm 450 and the ends of which rest respectively, one against the arm 450, and the other against the support element 100.

The second alternative form of embodiment according to the present invention and illustrated in the appended FIGS. 9 and 10 will now be described.

On the whole, the device according to this second alternative form of embodiment has a basic drawing structure the same as the one described previously with reference to FIGS. 1 to 8.

For this reason, the drawing structure of the second alternative form will not be described in detail hereinafter.

FIGS. 9 and 10 show the reserve bowl 100 comprising an end wall 110 and a cylindrical wall or skirt 120.

FIGS. 9 and 10 also show an arm 450 equipped with a gauging transducer 400.

The arm 450 is straight and secured to a cylindrical shaft 470 which is perpendicular to it.

The cylindrical shaft 470 is guided in a guide 480 connected to the cylindrical wall 120. The guide 480 is advantageously formed on the exterior surface of the cylindrical wall 120.

The guide 480 is preferably a cylindrical guide the internal volume of which complements the shaft 470. The guide 480 has its axis parallel to the axis of the reserve bowl 100. The guide 480 is designed to allow, in succession, the shaft 470 and the arm 450 to pivot about the axis of the guide 480, then the shaft 470 and the arm 450 to move in translation along this axis.

To these ends, the guide 480 further comprises an internal chamber complementing the volume of the shaft 470, a longitudinal groove 482 running parallel to the axis of the guide 480 and having a width that complements that of the arm 450. The groove 482 opens onto the lower end of the guide 480, that is to say onto the end on which the arm 450 is initially arranged.

At the outset, the arm 450 is retracted under the bowl 100, against the lower surface 110. The arm 450 runs roughly radially with respect to the axis of the bowl.

On the whole it is diametrically opposite the groove 482 with respect to the axis of the guide 480.

The device also comprises a spiral spring 490 placed in the guide 480. The spiral spring 490 has its ends respectively engaged with the guide 480 and with the cylindrical shaft 470. The spiral spring 490 urges the shaft 470 and the arm 450, on the one hand, to turn about the axis of the guide 480 and to move in terms of translation, toward its upper end.

Thus, the spiral spring 490 urges the shaft 470 and the arm 450 away from the retracted position under the bowl as illustrated in FIG. 9, toward a deployed position as illustrated in FIG. 10, in which the arm 450 projects outward, in a radial general direction with respect to the axis of the bowl.

The person skilled in the art will, however, understand that the translational movement along the axis of the guide 480 can take place only after the arm 450 has pivoted, when the latter is placed facing the groove 482, as illustrated in FIG. 10, of the arm 450 in the retracted initial position.

According to the alternative form illustrated in FIGS. 9 and 10, these blocking means are formed of a lever 491. This lever is in the shape of an L with two branches 492, 493. The lever 491 is articulated to the bowl 100 about an axis 494 directed more or less radially with respect to the axis of the bowl 100.

One of the branches 493 initially interferes with the path of movement of the shaft 470. The other branch 492 projects over the outside of the bowl. It extends more or less at right angles to the axis of the bowl. Its position and its length are tailored so that it automatically comes into contact with the edge of the opening of a fuel tank as the drawing device is fitted therein. The person skilled in the art will understand, on making a comparative examination of FIGS. 9 and 10, that, after pivoting about the axis 494, the lever 491 releases the cylindrical shaft 470.

Furthermore, in the context of the present invention, the device preferably comprises a locking means 495 able to prevent any initial pivoting of the lever 491.

In this particular instance, the locking means are preferably formed of a pin 495. This pin is immobilized on a complementary shape 496 molded onto the outer surface of the reserve bowl 100. When it is in position in this shape 496, the pin 495 acts as a stop for the lever 491.

The way in which the device illustrated in FIGS. 9 and 10 works is essentially as follows.

At the outset, the arm 450 and the gauging transducer 400 are retracted under the bowl 100. The lever 491 prevents any movement of the arm 450, and the lever 491 is immobilized by the pin 495.

However, the spring 490 urges the arm 450 into the deployed position as illustrated in FIG. 10.

To allow such a deployment, the pin 495 has first of all to be removed. The lever 491 is then free to move. However, such a movement can be performed only when, upon installing the drawing device in a tank, the branch 492 of the lever 491 comes to rest against an edge of the opening of the tank.

The lever 491 then pivots from the retracted position illustrated in FIG. 9 to the deployed position illustrated in FIG. 10. For that, the arm 450 first of all performs a pivoting movement about the axis of the guide 480 until the arm 450 is aligned facing the groove 482. The arm 450 then performs a translational movement along the axis of the guide 480, in the groove 482.

It will be noted that the spring 490 is, however, sized to constantly urge the gauging transducer 400 against the bottom of the fuel tank, when it is placed in the deployed position.

This then provides automatic indexing of the transducer 400 with respect to the bottom of the tank.

Of course, the present invention is not restricted to the particular embodiments which have just been described, but extends to cover any alternative form that is in accordance with its spirit.

What is claimed is:

1. A drawing and gauging device for a motor vehicle fuel tank, characterized in that it comprises an arm (450) mounted so that it can move on the device and which bears a gauging transducer (400), blocking means (491) able initially to hold the arm (450) in a retracted position folded against the body of the device, means (490) which urge the arm (450) toward a deployed position and means (200, 491) able automatically to release the blocking means (270, 491) as the device is fitted in a tank, in order to automatically deploy the arm (450) in the tank.

2. The device as claimed in claim 1, characterized in that it comprises two support assemblies (100, 200) capable of relative movement upon installation at the site of use into the motor vehicle, the arm (450) being mounted to pivot on one of the support assemblies.

3. The device as claimed in claim 1, characterized in that the transducer (400) is a piezoelectric transducer.

4. The device as claimed in claim 1, characterized in that it comprises an elastic member (460) urging the arm (450) toward a deployed position.

5. The device as claimed in claim 1, characterized in that the arm (450) is held in the retracted position, in storage, by the second element (200) so that the arm (450) is automatically deployed as the device is installed.

6. The device as claimed in claim 1, characterized in that said other support element (200) designed to hold the transducer (400) in a retracted position, in storage, comprises an opening (270) the size of which exceeds the bulk of the transducer (400) extended by a passage (272) the width of which exceeds the arm (450) but is smaller than the bulk of the transducer (400).

7. The device as claimed in claim 1, characterized in that it comprises a lever (491) mounted so that it can move on the body of the device, which interferes with the path of movement of the arm (450), and designed itself to be automatically retracted upon introduction into a tank by contact with the edge of the orifice through which it is being introduced.

8. The device as claimed in claim 7, characterized in that it comprises a pin (495) or an equivalent means able initially to lock the blocking means (491).

9. The device as claimed in claim 7 or 8, characterized in that the blocking means (491) is formed of a pivoting lever.

10. The device as claimed in claim 9, characterized in that the lever (491) has two branches: a first branch (493) which interferes initially with the path of movement of the arm (450) and a second branch (492) designed to be urged by the tank, during installation.

11. The device as claimed in claims 7–9 or 10, characterized in that the arm (450) is guided by a guide (480) which in succession imposes a pivoting and then a translational movement on the arm (450) to cause the latter to deploy.

12. The device as claimed in claim 1, characterized in that the two support assemblies (100, 200) are slideably mounted, one of them (100) being intended to rest against the bottom of the tank, while the other (200) is intended to be fixed to a wall of the tank.

13. The device as claimed in claim 1, characterized in that the first support element (100) designed to rest against the bottom of the fuel tank constitutes a fuel reserve that is open at the top.

14. The device as claimed in claim 1, characterized in that it comprises a venturi-effect pump (350) to supply a reserve formed by the first support element (100).

15. The device as claimed in claim 1, characterized in that the first support element (100) comprises a nozzle (106) connected to the outlet side of an electric pump (310) and the second support element (200) comprises a tube (206) engaged with sealing on the aforementioned nozzle and itself connected to a nozzle accessible on the outside of the device.

16. The device as claimed in claim 15, characterized in that it comprises an annular seal with an X-shaped cross section having four lobes which is inserted between the nozzle (106) and the tube (206).

17. The device as claimed in claim 1, characterized in that it comprises at least one elastic member (250) inserted between the two support elements (100, 200) to urge these apart.

18. The device as claimed in claim 1, characterized in that it comprises a fine filter (314) associated with the inlet side of the pump (310), and of annular geometry, arranged around the pump (310).

19. The device as claimed in claim 1, characterized in that the second support element (200) has a base (210) which bears a nozzle (230) able to be arranged in several positions depending on the surroundings.

20. The device as claimed in claim 19, characterized in that the nozzle (230) can be placed in two positions spaced 180° apart on the base (210).

21. The device as claimed in claim 1, characterized in that it comprises an electric connector (240) borne by a base (210) of the second support element (200) and able to occupy several positions according to the surroundings.

* * * * *